Aug. 6, 1963

E. E. GRAY ET AL 3,100,238

RADAR SIMULATION

Filed May 29, 1961

*INVENTORS*
*EDWARD E. GRAY*
*KEITH E. McFARLAND*
BY *Edward A. Robinson*
ATTORNEY

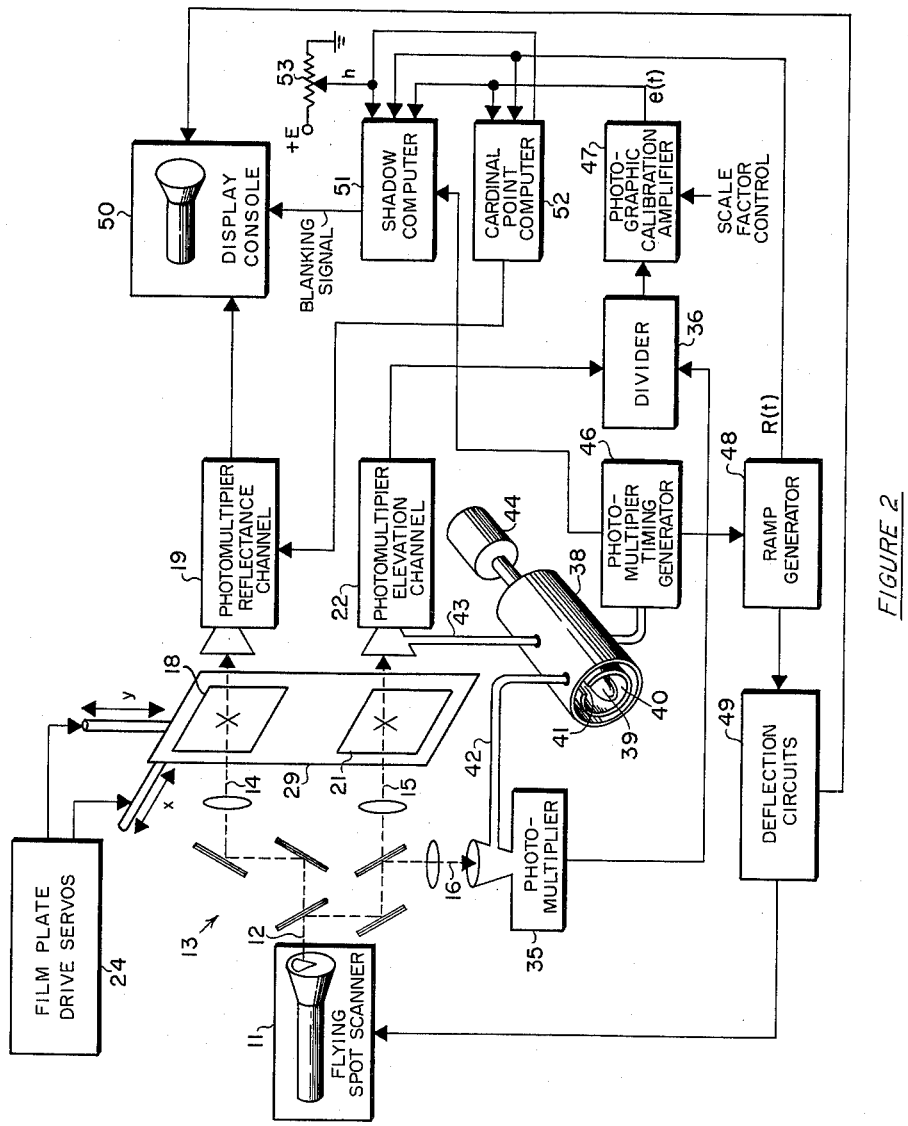

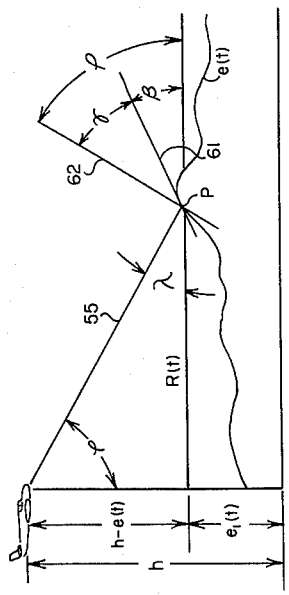
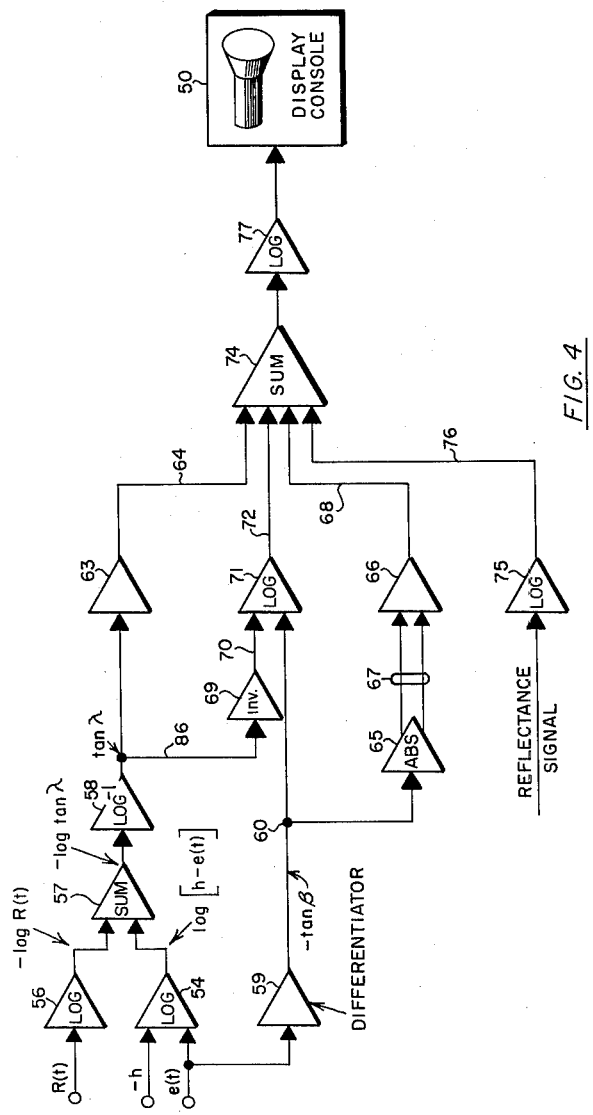

Aug. 6, 1963  E. E. GRAY ET AL  3,100,238
RADAR SIMULATION

Filed May 29, 1961  4 Sheets-Sheet 4

INVENTORS
EDWARD E. GRAY
KEITH E. McFARLAND
BY Edward A. Robinson
ATTORNEY

United States Patent Office 3,100,238
Patented Aug. 6, 1963

3,100,238
RADAR SIMULATION
Edward E. Gray, Mountain View, and Keith E. McFarland, Palo Alto, Calif., assignors to General Precision, Inc., Binghamton, N.Y., a corporation of Delaware
Filed May 29, 1961, Ser. No. 113,196
8 Claims. (Cl. 35—10.4)

This invention relates to aircraft simulators for training personnel in the operation and observation of radar, and more particularly, this invention relates to methods and means for simulating a radar display of terrain information as such a display would appear on the scope of a radar in an aircraft flying over the terrain. This invention is related to other inventions disclosed in three co-pending United States patent applications which are assigned to the same assignee as the instant application. A first of the co-pending applications was filed by Edward E. Gray, Thomas P. Pappas and Richard L. Taylor on July 8, 1960, Serial No. 41,522, entitled "Terrain Radar Simulation." The second co-pending patent application was filed by Edward E. Gray, Keith E. McFarland and Kenneth R. Hackett on July 8, 1960, Serial No. 41,564, entitled "Radar Simulation," and now Patent No. 3,031,774, granted May 1, 1962. The third co-pending patent application was filed by Edward E. Gray, Peter N. Schink and Robert S. C. Young, concurrently with the instant application, entitled "Terrain Radar Simulation," Serial No. 113,197, and now Patent No. 3,067,526, granted December 11, 1962.

Aircraft simulators are commonly used for teaching and practicing aircraft flight, navigation and the like; and such apparatus being grounded eliminates hazards of airborne teaching and provides savings in time and expense. Ordinarily, aircraft simulators provide a student station resembling the cockpit of an airplane and having seats for students which are positioned in proper spaced relation with a set of aircraft controls and an instrument panel with a complement of instruments similar to those of an actual aircraft. In addition to the normal aircraft controls and instruments, the training apparatus may include auxiliary equipment such as simulated radar.

Actual radar apparatus may use a cathode ray tube, C.R.T., for the visual display of information contained in the return pulses of radiation which are transmitted to and reflected back from various objects, targets and from terrain features. The display is generated by an electron beam which scans lines radially from a central point representing the location of the aircraft on the scope. Bright spots or blips representing targets or terrain features will appear at spaced intervals on the scope corresponding to the range or distance from the aircraft to the actual targets being detected. The radar display may resemble a map wherein various terrain features and other objects will appear as bright spots in scaled relation to the position of the aircraft. The aircraft radar may transmit a beam which is interrupted by a large terrain feature such as a mountain; and a shadow area will appear behind the bright area corresponding to the face of the mountain. The co-pending patent application 113,197 supra, discloses and claims a method and means for blanking the video signal in a simulated radar scope to provide such shadow areas.

In actual aircraft radar, the display of particular terrain features may be considerably brighter than the display of other terrain features due to variations in the reflectance quality of the terrain with respect to radar type radiation and due to variations in the angle of incidence of the radar beam which impinges upon the contours of the terrain features.

As disclosed in the co-pending patent applications, Serial Nos. 41,522 and 41,564, supra, a radar display of terrain may be generated by scanning a map having contour information thereon by means such as a flying spot scanner to develop a video signal which may be applied to a cathode ray display device or console in accordance with known television art. As taught by the invention disclosed by the patent application Serial No. 113,197, supra, the video signal may be modified in accordance with computed elevation information to provide shadow areas behind large terrain features such as mountains. To further improve the quality of a simulated radar display, it is desirable that the video signal be further modified in accordance with the various angles of incidence of the simulated radar beam upon the terrain features which may be computed from the elevational information from the scanned map.

In the display of an actual aircraft radar, certain features are enhanced while others are suppressed due to the relative angle of incidence with which the radar beam strikes the terrain. Thus, a target may appear different to a radar system when viewed from different spatial positions, or from different bearings of the compass. There are very few radar targets, either natural or man-made, which are symmetrical when viewed from different angles in space. The effect of the projected area of the target on the magnitude of the radar return is the key to providing adequate simulation to the "cardinal point" or aspect angle effect. Indeed, the "cardinal point" effect is so named because many cities have streets extending either north and south or east and west, and the buildings lining the streets will have walls or surface areas likewise extending along the cardinal points of the compass. When an aircraft approaches such a city with a cardinal heading, the many building walls and surfaces presented perpendicularly to the radar scanning from the aircraft will create an exaggerated radar return.

It is an object of this invention to provide an improved method and means for generating a simulated radar display of terrain, and more specifically, it is an object to provide such a display wherein certain terrain features are emphasized and certain other terrain features are de-emphasized in accordance with a computed angle of incidence made by a simulated radar beam impinging upon computed terrain features.

A further object of this invention is to provide improved apparatus for simulating a radar display of terrain wherein a flat map area is scanned to generate a video signal, and more specifically, it is an object to provide a means for modifying the video signal in accordance with computed incidence angles of various incremental areas of the terrain such that the video signals will be increased when the angle of incidence approaches a perpendicular with the terrain, and the video signals will be diminished for such areas wherein the angle of incidence becomes small.

Numerous other objects and advantages will be apparent throughout the progress of the specification which follows. The accompanying drawings illustrate a certain selected embodiment of the invention and the views therein are as follows:

FIGURE 2 is a schematic diagram of a circuit for generating a simulated display of terrain, including means for modifying the video signals in accordance with a computed angle of incidence;

FIGURE 3 is a diagram illustrating the geometry upon which provides a basis for the computations of the cosine function of the angle of incidence for an incremental area of scanned terrain;

FIGURE 4 is a diagram of the circuit of the cardinal point computer and reflectance video channel shown as blocks in FIGURE 2;

Briefly stated, according to a preferred embodiment of this invention, a simulated radar display is generated by a video signal obtained by the simultaneous scanning of two maps to obtain both elevational infomation and radar reflectance information. The video signal is obtained from scanning the reflectance information, and is modified in accordance with a computed cosine function of the angle of incidence between incremental areas of the simulated terrain and the simulated radar beam obtained from the elevational information. This computation is accomplished by an aspect angle or cardinal point computer which receives analog signals corresponding to the ground range, $R(t)$, or horizontal distance from the simulated aircraft to the incremental area of terrain being scanned, the altitude, $h$, of the simulated aircraft above sea level, and the elevation, $e(t)$, of the incremental terrain area being scanned (see FIGURE 3). The height of the simulated aircraft above the scanned incremental area of the terrain is computed as the difference between the altitude and the terrain elevation, $h-e(t)$, and the tangent of an angle $\lambda$ extending upwardly to the aircraft from the horizontal is computed as the ratio between this difference quantity and the ground range, $$\frac{h-e(t)}{R(t)}$$

The elevation signal, $e(t)$, is differentiated to obtain a signal, $$\frac{d}{dt}e(t)$$

representing the terrain slope at the incremental area being scanned and equal to the tangent of an angle $\beta$. The cosine of the angle of incidence, $\gamma$, is computed by analog methods from the tangent functions of the angles $\lambda$ and $\beta$. The reflectance video signal may be effectively multiplied by the cosine of the angle of incidence $\gamma$ to obtain a modified video signal which may be impressed upon a display console in accordance with known techniques to provide a simulated radar display wherein certain terrain features are exaggerated and others are diminished in accordance with the cardinal point effect.

Figure 1:
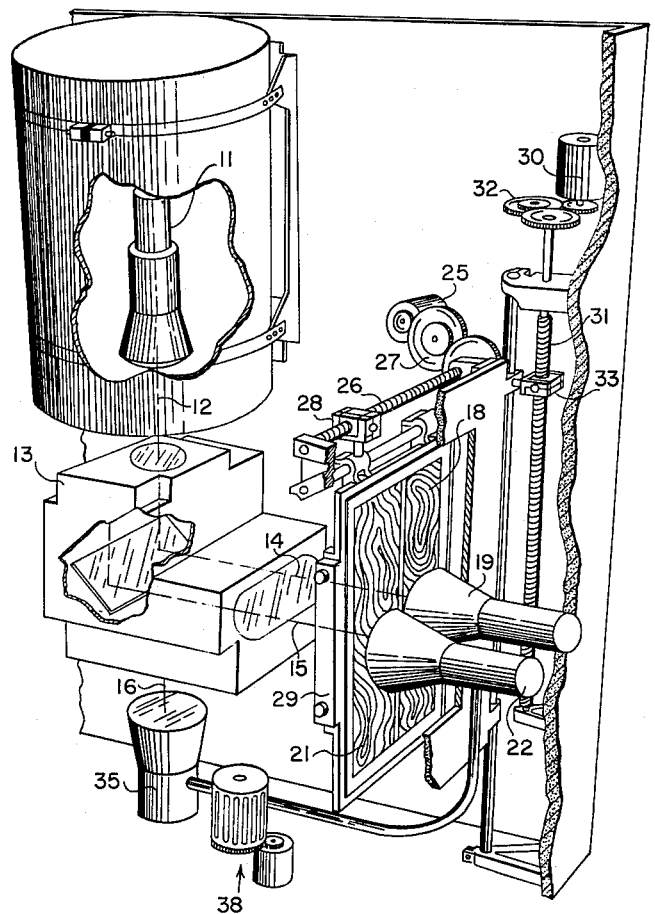
FIGURE 1 is a perspective view of an arrangement for scanning a map in accordance with this invention.

As shown in FIGURE 1, a flying spot scanner comprises a cathode ray tube 11 which furnishes a moving spot or beam 12, and an optical system 13 which splits the initial beam 12 into several beams 14, 15 and 16. The scanning beam 14 passes through a photographic plate 18 having radar reflectance data recorded thereon in the form of a map wherein the terrain is displayed in various shades of gray corresponding to the reflectance qualities of the terrain surfaces. A photo multiplier 19 receives the scanning beam 14 from the photographic plate 18 and develops a reflectance video signal. The second scanning beam 15 is focused upon a second photographic plate 21 containing contour or elevational information of the terrain also in various shades of gray. A photo multiplier 22 receives the scanning beam 15 from the photographic plate 21 and develops a signal corresponding to the varying elevation of the terrain as it is being scanned.

The photographic plates 18 and 21 containing the map information in various shades of gray may be prepared by a technique which is fully described in a bulletin entitled "Dystrip Technique of Color Separation" by the Aeronautical Chart and Information Center, Air Photographic and Charting Service (MATS). This technique involves photographing contour lines of a map onto a negative, and then preparing diapositive transparencies therefrom. The photographic emulsion may then be peeled away from and removed from the film in particular areas representative of elevations. After each peeling or stripping process an exposure is made of the photographic plate through "windows" or specific openings stripped away from the film. After each successive exposure a further contour elevation is stripped away enlarging the "windows" and another exposure of the plate is made therethrough. After all of the successive exposures have been completed and the photographic plate is processed, high elevations such as mountain tops will be comparatively black and low elevations will be comparatively white with various shades of gray representing elevations therebetween. The photographic plate 18 may be similarly processed from an initial map containing radar reflectance contour lines rather than elevational contour lines. The elevation signal obtained by scanning the photographic plate 21 will provide an input for analog computations and therefore must have an accuracy comparable to the computational accuracy. However, the video signal obtained by scanning the photographic plate 18 need not supply accurate analog information. Satisfactory radar simulation has been obtained by use of photographic plates wherein reflectance information was provided in 5 discrete shades of gray, and wherein elevational information was provided in 30 shades of gray.

The maps 18 and 21 are moved with respect to the scanning means to simulate movement of the simulated aircraft across the terrain. X and Y servo drives 24 (FIGURE 2) are coupled to move the photographic plates in accordance with the simulated motor of the aircraft. The X servo drive provides horizontal movement of the photographic plates and comprises a motor 25 which may rotate a lead screw 26 via a chain of gears 27. As the lead screw 26 rotates, a lead nut 28 will move therealong and a carriage 29 mechanically coupled to the lead nut 28 will be shifted horizontally. The Y servo drive comprises a motor 30 coupled to another lead screw 31 via another chain of gears 32. As the lead screw 31 rotates a lead nut 33 will move vertically carrying the carriage and the X servo drive therewith A cathode ray tube, CRT, generates a scanning spot of light as an electron beam impinges upon a layer of phosphors. The phosphor layer may be somewhat non-uniform, and the response characteristics of the individual phosphor granules may differ somewhat whereby the light intensity of the scanning spot may have variations which will appear in the beam 16 received by a photo multiplier 35. The signal generated by the photo multiplier 22 containing elevational information is passed to a divider circuit 36 which also receives the flying spot scanner monitor signal from the photo multiplier 35. The divider 36 continuously corrects the elevation signal for the variations in the brightness of the flying spot scanner.

It has been found that photo multipliers such as 22 and 35 have an inherent low frequency drift characteristic which may introduce further inaccuracies in the elevation signal. A light chopper 38 provides a means for correcting the gain of the photo multipliers 22 and 35 to compensate for the low frequency drift. The light chopper includes a standard light source 39 within a rotating cylinder 40 having an aperture 41 therein. When the aperture 41 comes into alignment with a pair of lucite rods or light pipes 42 and 43, the light from the standard source 39 is applied to the photo multipliers 22 and 35. The cylinder 40 is rotated by a synchronous motor 44 such that light pulses are applied to the photo multipliers during re-trace times between successive scans by the flying spot scanner 11. The light chopper 38 also provides timed pulses of light to another photo multiplier 46 which generates electrical timing pulses to further circuitry of this invention.

In addition to variations in the light intensity of the flying spot scanner, and to gain variations introduced by the photo multiplier, a further inaccuracy may result due to non-linearities in the grayness structure of the photographic plate 21 resulting from the photographic processing thereof. A non-linear amplifier 47 receives the elevational signal from the divider 36 and corrects for the non-linearities of the photographic process from the amplifier 47. A signal, $e(t)$, is passed from the amplifier 47 and corresponds with the elevation of the incremental areas being scanned on the photographic plate or map area 21. The operation of the photo multipliers 22 and 35, the light chopper 38 and the signal correction circuits 36 and 47 is more fully described in the co-pending patent application, Serial No. 41,564, supra.

The photo multiplier timing pulse generator 46 passes timing pulses to a ramp or saw-tooth wave generator 48 which in turn is coupled to the deflection circuits 49 associated with both the flying spot scanner 11 and a display console 50. In addition to controlling the deflection circuits, the ramp generator 48 provides a ramp signal, $R(t)$, which increases linearly with time for each scanned line, and therefore, may be considered proportional to the ground range or horizontal distance between the simulated aircraft and each incremental area of terrain being scanned. Both the shadow computer 51 which is the subject of the co-pending patent application, Serial No. 113,197, supra, and the cardinal point or aspect angle computer 52 receive three analog signals. The elevation signal, $e(t)$, the ground range signal, $R(t)$, and an altitude signal, $h$, corresponding with the simulated altitude of the aircraft above sea level are impressed on both computer circuits 51 and 52. The altitude signal, $h$, may be derived from the pilot controls of the aircraft simulator by means such as a potentiometer 53 coupled between reference voltages for providing an input signal which may be considered as a constant voltage for any particular scanned line.

The computation of the angle of incidence between the simulated radar beam and an incremental area of the terrain may be understood by a consideration of FIGURE 3 in conjunction with the circuit diagram of FIGURE 4. An initial computation is made by an amplifier 54 which receives a positive analog signal representative of the elevation, $e(t)$, and a negative signal corresponding to the aircraft altitude, $-h$. As these two signals are summed by the amplifier 54 the equivalent input thereto will be the difference between the aircraft altitude and the terrain elevation which corresponds to the height of the aircraft over the terrain being scanned. This value corresponds with the dimension, $h-e(t)$, as shown in FIGURE 3 and constitutes one leg of a right triangle—the other leg being a horizontal line equal to the ground range, $R(t)$, and the hypotenuse being the line of sight of the radar 55. The amplifier 54 may contain a diode resistance network as a feedback path to provide non-linear characteristics such that the output therefrom will correspond with the logarithm of the height of the aircraft above the ground, $\log[h-e(t)]$. The signal representative of the ground range $R(t)$ corresponds with the second leg of the right triangle and is impressed upon a non-linear amplifier 56 such that the output thereof will be a negative analog signal corresponding with the logrithm of the ground range, $\log R(t)$. Both logarithmic signals are passed to a summing amplifier 57 which sums the positive signal, $\log[h-e(t)]$ with the negative signal, $-\log R(t)$, to provide an output which is the difference of the logarithms or the logarithm of the quotient since:

(1) $\log[h-e(t)] - \log R(t) = \log \dfrac{h-e(t)}{Rt} = \log \tan \lambda$

From the trigonometry of FIGURE 3 it may be appreciated that the quotient of $[h-e(t)]$ divided by $R(t)$ constitutes the tangent of an angle $\lambda$ which is the angle extending upwardly between the horizontal leg $R(t)$ of the triangle and the hypotenuse, the radar line of sight. The angle $\lambda$ is the complement of an angle $\rho$ which is the angle subtended from the aircraft by the radar line of sight. The analog signal from the amplifier 57 is negative in polarity ($-\log \tan \lambda$), and is passed to a non-linear amplifier 58 which generates a positive analog signal corresponding to the antilogarithms of its input which is the tangent of $\lambda$.

As shown in FIGURE 4, the analog signal, $e(t)$, is passed through the amplifier 54 and subsequent circuitry to derive an analog signal corresponding to the tangent of $\lambda$, and simultaneously the analog signal, $e(t)$, is passed to a differentiating amplifier 59 which provides an analog signal at a point 60 corresponding to the differential with respect to time, $$\frac{d}{dt}e(t)$$

At a specific point P (FIGURE 3), the differentiated value of $e(t)$ will constitute the slope of a line 61 tangent to the curve, $e(t)$, and will be equal to the tangent of an angle $\beta$ between the tangent line 61 and the horizontal. From the geometry of FIGURE 3, it may be appreciated that the difference between the angle $\rho$ and the angle $\beta$ will equal an angle $\gamma$ which corresponds to the tilt angle between the slope of the terrain 61 and a line 62 perpendicular to the radar line of sight. Obviously, if the angle $\gamma$ were zero, the radar return would be a maximum, and if the angle $\gamma$ were 90° the radar return would be zero. Thus, the intensity of the reflected radar beam may be seen to correspond with the cosine of the angle $\gamma$, and the circuit of FIGURE 4 is provided to compute a close proximation to the $\cos \gamma$ and to modify the reflectance signal in accordance therewith.

As indicated above with reference to FIGURE 3:

(2) $\qquad \cos \gamma = \cos(\rho - \beta)$ where (3) $\qquad \rho = 90° - \lambda$ Combining Equations 2 and 3

(4) $\qquad \cos \gamma - \cos(90 - \lambda - \beta) = \sin(\lambda + \beta)$

Expanding the sine function (5) $\qquad \cos \gamma = \sin \lambda \cos \beta + \sin \beta \cos \lambda$ Factoring $\cos \lambda \cos \beta$ (6) $\qquad \cos \gamma = \cos \lambda \cos \beta (\tan \lambda + \tan \beta)$ Since (7) $\qquad \tan^2 \lambda + 1 = \sec^2 \lambda = \dfrac{1}{\cos^2 \lambda}$ (8) $\qquad \cos \lambda = \sqrt{\dfrac{1}{1+\tan^2 \lambda}}$ Likewise (9) $\qquad \cos \beta = \sqrt{\dfrac{1}{1+\tan^2 \beta}}$ Substituting Equations 8 and 9 into Equation 6

(10)

$$\cos \gamma = \left(\sqrt{\dfrac{1}{1+\tan^2 \lambda}}\right)\left(\sqrt{\dfrac{1}{1+\tan^2 \beta}}\right)(\tan \lambda + \tan \beta)$$

By approximation:

(11)

$$\cos \gamma \doteq \left(\dfrac{1}{1+\tfrac{3}{4}|\tan \lambda|}\right)^k \cdot \left(\dfrac{1}{1+\tfrac{3}{4}|\tan \beta|}\right)^k \cdot (\tan \lambda + \tan \beta)$$

From Equation 11 above, it becomes apparent that the cosine of the angle $\gamma$ is equal to the product of three factors each involving functions of the tangents of the angles λ and β. Although this is an approximation, it has been determined empirically to be sufficiently accurate to be within the limits of the analog computations required in the determination of the cosine of γ.

A non-linear amplifier 63 receives the analog signal representative of the tangent of λ, and generates a signal on a lead 64 corresponding to the logarithm of the quantity $(1+¾|\tan λ|)$. The structure and operation of the amplifier 63 will be more fully described in connection with FIGURE 5. It may be noted that the quantity $(1+¾|\tan λ|)$ requires the absolute value of the tangent of λ, but since λ varies only within the limits of 90° and 0° with each scanning operation, the value thereof is always positive, and therefore, no special circuitry need be provided to assure a positive absolute value signal. An analog signal corresponding to the function, $|\tan β|$, is provided by an absolute value amplifier 65 which receives a signal representative of the negative tangent of β from the point 60 and generates a signal which corresponds to the tangent of β but remains positive regardless of changes in polarity of the signal at the point 60. A non-linear amplifier 66 receives the signal representative of the absolute value of the tangent of β from the amplifier 65 via a pair of leads 67 and generates an analog output signal representative of the quantity, $(1+¾|\tan β|)$, which signal is passed to an output lead 68. The structure and operation of the amplifiers 65 and 66 will be described in connection with FIGURE 6.

An inverting amplifier 69 receives the signal corresponding to tangent of λ and develops the negative signal therefrom $(-\tan λ)$ on a lead 70. A non-linear amplifier 71 receives the negative signals corresponding to the values of the tangent of λ and the tangent of β, which signals are summed and the output therefrom on a lead 72 will correspond to the logarithm of $(\tan λ+\tan β)$. The three analog signals appearing on the leads 64, 68 and 72 are in logarithmic form and will be summed by an amplifier 74 together with a signal corresponding to the logarithm of the reflectance video signal.

The negative value of the reflectance signal is applied to a non-linear amplifier 75 and a signal is generated on a lead 76 to the summing amplifier 74 which signal corresponds with the logarithmic value of the reflectance signal. The structure and operation of the summing amplifier 74 will be more fully described in connection with FIGURE 7. The summing amplifier 74 effectively multiplies the reflectance signal by the function of $(\tan λ+\tan β)$, and divides the reflectance signal by the function of $(1+¾|\tan λ|)^k$ and by the function $(1+¾|\tan β|)^k$. A further non-linear amplifier 77 receives the signal from the summing amplifier 74 and develops a signal corresponding to the antilogarithm thereof, and applies this signal to the display consoles 50.

Figure 5:
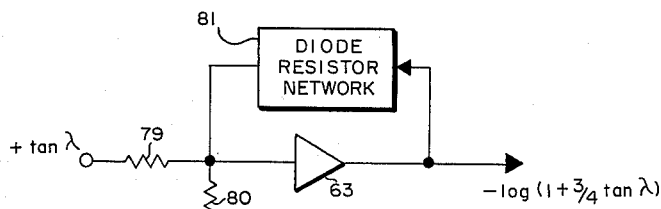
FIGURE 5 is a diagram illustrating an operational amplifier arrangement for generating a special logarithmic function of an input signal, this amplifier being shown as a block in FIGURE 4.

Certain of the analog computing amplifiers shown in FIGURE 4 have been used heretofore in standard analog circuits. The summing amplifier 59 may be substantially as shown and described in a book entitled "Electronic Analog Computers," by Korn and Korn, published in 1956 by the McGraw-Hill Book Company, with specific reference to FIGURE 2.2, page 39. The non-linear amplifiers 54, 56, 58, 71, 75 and 77 for generating an output analog signal corresponding to the logarithm or the antilogarithm of an input signal may include resistor diode networks or function generators as feedback paths to provide the desired output characteristics. An amplifier of this type is specifically disclosed by FIGURE 6.25(c) on page 295 of the book by Korn and Korn, supra. The inverter amplifier 69 may be merely a linear amplifier having a unity gain such that the output signal is the negative of the input signal. The differentiation amplifier 59 may be of the type shown by FIGURE 1.5(h), page 13 of the Korn and Korn book, supra. By careful design and by choice of high quality components the computing amplifiers may perform at a megacycle rate with acceptable accuracy. The amplifier 63 of FIGURE 4 receives an analog signal corresponding to the tangent of λ, and generates a signal corresponding to the negative logarithm function, $-\log (1+¾|\tan λ|)$. As shown in FIGURE 5, the analog input representative of the positive tangent of λ is passed through an input summing resistor 79 to the summing junction of the amplifier 63. Another summing resistor 80 is coupled to a positive reference voltage $+E$ and provides a constant analog input signal to the summing junction. Thus, two signals are applied to the summing junction of the amplifier 63, one of which is constant and corresponds to the unity term of the function $(1+¾|\tan λ|)$, while the other corresponds to the tangent λ term thereof. The values of the summing resistors 79 and 80 may be of the ratio of 4 to 3 with respect to each other to provide the proportionality between the constant term and the tangent function term. A diode resistor network 81 similar to that disclosed by the reference Korn and Korn, supra, will provide a non-linearity of the amplifier output voltage with respect to the input signals thereto such that the logarithm function of the input is generated. The inputs to the amplifier 63 are positive in character, and because of the phase reversal in the amplifier and the non-linearity thereof, the output analog signal will correspond to the negative of the logarithmic function, $-\log (1+¾ \tan λ)$.

Figure 6:
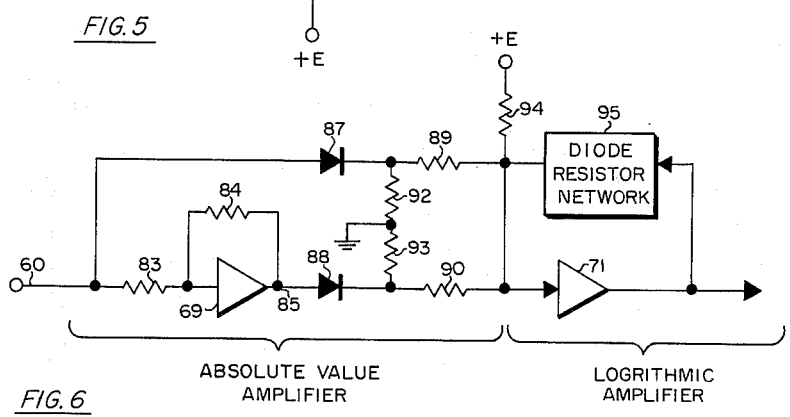
FIGURE 6 is a diagram illustrating an absolute value amplifier coupled to a non-linear logarithmic amplifier both shown as blocks in FIGURE 4.

FIGURE 6 illustrates in particular the combination of amplifiers shown as blocks 65 and 66 of FIGURE 4. The absolute value amplifier 69 provides effective full wave rectification of the input signal such that a positive analog signal is impressed upon the logarithmic amplifier 71 regardless of the polarity of the input signal. Thus, the amplifier 69 is provided with an input resistor 83 and a feedback resistor 84 whereby the signal appearing at a point 85 will be the negative of the signal appearing at the input point 60. A diode 87 is coupled to the direct signal from the input point 60, and another diode 88 is coupled to the inverted signal from the amplifier 69. The diodes 87 and 88 function to pass only positive signals via summing resistors 89 and 90 to the subsequent amplifier 71 and will block any signal which is of negative polarity. Thus, for example, if the analog signal from the point 60 is of positive polarity, the corresponding signal at the point 85 will be negative, whereupon the diode 87 will conduct and pass the positive signal via the resistor 89 to the summing junction of the amplifier 71. On the other hand, if the analog signal at the point 60 is negative, the corresponding signal at the point 85 will be positive such that the diode 88 will conduct and pass the positive signal via the summing resistor 90 to the amplifier 71. In any event the signal applied to the amplifier 71 is positive in polarity and equal to the absolute value of the signal at the point 60. To provide a discharge path for the diodes 87 and 88, and to improve the high frequency response of the circuit, a grounding network is provided by a pair of resistors 92 and 93. As in the case of the amplifier 63, a constant reference voltage is applied to the summing junction via a summing resistor 94 to provide the constant unity term of the function $(1+¾|\tan β|)$. The resistors 89 and 90 are equal in value to each other, and the resistor 94 may have a value equal to ¾ of the value of each resistor 89 and 90 to provide the required proportionality between the inputs. Also, as in the amplifier 63, a diode resistor network 95 is connected as a feedback path to provide a non-linear logarithmic output signal from the amplifier 71.

Figure 7:
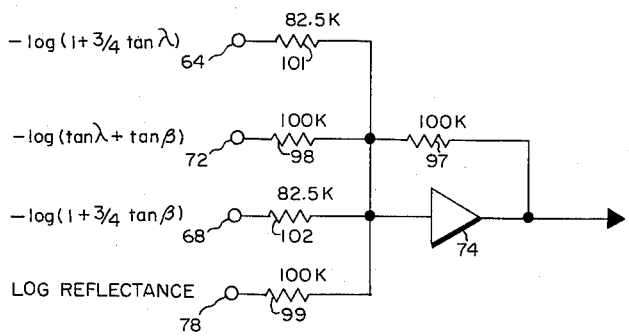
FIGURE 7 is a diagram of a special summing amplifier illustrated as a simple block in FIGURE 4.

FIGURE 7 shows the input and feedback connections associated with the summing amplifier 74. In a preferred form of this invention, a feedback resistor 97 is equal in value to two of the input resistors 98 and 99, each shown as 100,000 ohms. Two further input resistors 101 and 102 are equal in value and are each equal to 82.5% of the feedback resistor or 82,500 ohms. Since each of the input signals applied to the summing amplifier of FIGURE 7 is logarithmic in character the analog output therefrom will be the summation of the logarithmic quantities or the logarithm of the product-quotient of the various inputs. The summation of the logarithmic quantities may be correlated with Equation 11 above where it is seen that the function (tan λ+tan β) will be divided by the quantities $(1+\frac{3}{4}|\tan \lambda|)^k$ and $(1+\frac{3}{4}|\tan \beta|)^k$. The value of the exponent $k$ has been determined empirically to be 1.22. In the summation of the logarithm quantities, the ratio of the input resistors 101 and 102 to the feedback resistor 97 effectively raises to the power of $k$, the quantities represented by those analog input signals. Since the logarithmic quantities applied to the input leads 64 and 68 are negative, a division is performed with these two quantities effectively being in the denominator as shown by Equation 11.

The three factors of Equation 11 are applied to the input leads 64, 68 and 72 and together constitute the cosine of γ. Since these logarithmic quantities are combined with the logarithm of the reflectance signal impressed on the lead 76, the reflectance signal is effectively multiplied by the cosine of γ. As shown in FIGURE 4, the output from the amplifier 74 is passed through a non-linear amplifier 77 to obtain a signal corresponding to the antilogarithm of the reflectance signal multiplied by the cosine of γ. which signal is applied to the display console 50.

Since the output signals from the computing apparatus of this invention are used to generate a video display, the computations must be accomplished at a high signal frequency, over one megacycle rate. Although these computations must be made exceedingly fast to provide a video signal for the display, these computations need not have greater accuracies than may be perceptible to a human eye which will view the display. Variations in the brightness of the image may be as great as 10% without being distinguishable to the average human eye, and therefore, the overall accuracy of the computing apparatus of this invention need not be greater than 10%. In a specific application of this invention, the various components such as summing amplifiers and non-linear amplifiers individually produced errors as great as 1% such that the overall error of the system was of the order of 3% to 4%. This degree of accuracy was found to provide a very good simulated radar display.

The amplifiers 54 and 56 (FIGURE 4) receive the analog signals representative of the input quantities R(t), h, and e(t) and develop therefrom signals representative of the logarithm of R(t), and the logarithm $[h-e(t)]$. Since these same logarithmic quantities are required for the shadow computer 51 which is the subject of the copending patent application, Serial No. 113,197, supra, these amplifiers 54 and 56 may be shared by the two computing circuits 51 and 52. For ease of understanding the inventions, the equivalent amplifiers 54 and 56 have been shown in both patent applications, but it will be appreciated that this duplication of equipment is unnecessary in a complete terrain radar simulation built in accordance with this invention.

Changes may be made in the form, construction and arrangement of the parts without departing from the spirit of the invention or sacrificing any of its advantages and the right is hereby reserved to make all such changes as fall fairly within the scope of the following claims.

The invention is claimed as follows:

1. A method for simulating a radar display of terrain, said method comprising the steps of: scanning a first map to generate a video signal having radar reflectance information therein; scanning a second map to generate a first analog signal corresponding to the elevation of the terrain; generating a second analog signal which is linear with respect to time for each scan and which corresponds to the horizontal distance from a simulated aircraft position to the terrain area being scanned; establishing a third analog signal corresponding to a simulated altitude of the aircraft; computing the tangent function of an angle between a simulated radar line of sight between the simulated aircraft to the terrain being scanned and the horizontal from the first, second and third analog signals; computing the tangent of an angle between the horizontal and the slope terrain being scanned; computing the cosine function of an angle between the terrain being scanned and a perpendicular to the simulated radar line of sight in accordance with an equation:

$$\cos \gamma = \left(\frac{1}{1+\frac{3}{4}|\tan \lambda|}\right)^k \cdot \left(\frac{1}{1+\frac{3}{4}|\tan \beta|}\right)^k \cdot (\tan \lambda + \tan \beta)$$

where cos γ represents the cosine of the angle between the terrain being scanned and the perpendicular to the simulated radar line of sight, tan β represents the slope of the terrain being scanned, and tan λ represents the tangent of the angle between the simulated radar line of sight and the horizontal; multiplying the video signal with the cosine function to obtain a modified video signal; and impressing the modified video signal upon a display means for generating the radar display of terrain.

2. A method for simulating a radar display of terrain, said method comprising the steps of: scanning a first map to generate a video signal having radar reflectance information therein; scanning a second map to generate a first analog signal, e(t), corresponding to the elevation of the terrain; generating a second analog signal, R(t), which is linear with respect to time for each scan and which corresponds to the horizontal distance from a simulated aircraft position to the terrain area being scanned; establishing a third analog signal, h, corresponding to a simulated altitude of the aircraft; computing the tangent function of an angle, λ, between the horizontal and a simulated radar line of sight between the terrain being scanned and the simulated aircraft in accordance with the formula $$\tan \lambda = \frac{h-e(t)}{R(t)}$$

computing the tangent of the angle, β, between the horizontal and the slope of the terrain being scanned by differentiating the first analog signal, e(t); computing a cosine of an angle, γ, between the terrain being scanned and a perpendicular to the line of sight in accordance with the formula $$\cos \gamma = \left(\frac{1}{+1\frac{3}{4}|\tan \lambda|}\right)^k \cdot \left(\frac{1}{1+\frac{3}{4}|\tan \beta|}\right)^k \cdot (\tan \lambda + \tan \beta)$$

multiplying the video signal with the cosine of the angle γ to obtain a modified video signal; and impressing the modified video signal upon a cathode ray tube means for generating the simulated radar display of terrain.

3. Apparatus for simulating a radar display of terrain, said apparatus comprising means for scanning a map to generate a video signal corresponding to radar reflectance information and to generate a first analog signal corresponding to elevation of the terrain, computing means for receiving the first analog signal and for generating a second analog signal corresponding to the slope of the terrain, means for generating a third analog signal corresponding to a function of an angle of the radar line of sight, and computing means coupled to receive the second and third analog signals and operable to modify the video signal in accordance with a computed function of the angle of incidence between the simulated radar line of sight and the slope of the terrain said cosine of the angle of incidence being derived in accordance with an equation:

$$\cos \gamma = \left(\frac{1}{1+\frac{3}{4}\tan \lambda}\right)^k \cdot \left(\frac{1}{1+\frac{3}{4}|\tan \beta|}\right)^k \cdot (\tan \lambda + \tan \beta)$$

where cos γ corresponds to the cosine of the angle of incidence, tan λ corresponds to the third analog signal, and tan β corresponds to the second analog signal.

4. Apparatus for simulating an aircraft radar display of terrain, said apparatus comprising means for scanning a map to generate a video signal corresponding to radar reflectance information and to generate a first analog signal corresponding to an elevation curve of the terrain, means for differentiating the first analog signal to obtain a second analog signal corresponding to the slope of the terrain curve, means for generating a third analog signal which varies linearly with respect to each scanning time and which corresponds to the ground range of each incremental area of terrain, means coupled to receive the first analog signal and operable to generate a fourth analog signal corresponding to the height above the terrain, computing means coupled to receive the third analog signal and the fourth analog signal and operable to generate a fifth analog signal corresponding to the tangent function of an angle extending upwardly from the terrain to the simulated aircraft, and computing means coupled to receive the second analog signal and the fifth analog signal together with the video signal and operable to effectively multiply the video signal by the cosine of an angle of incidence of the simulated radar line of sight computed from the tangent functions of the terrain slope and the simulated radar line of sight said cosine of the angle of incidence being derived in accordance with an equation:

$$\cos \gamma = \left(\frac{1}{1+\sqrt[3]{4}\tan \lambda}\right)^k \cdot \left(\frac{1}{1+\sqrt[3]{4}|\tan \beta|}\right)^k \cdot (\tan \lambda + \tan \beta)$$

where $\cos \gamma$ corresponds to the cosine of the angle of incidence, $\tan \lambda$ corresponds to the fifth analog signal, and $\tan \beta$ corresponds to the second analog signal.

5. Apparatus for simulating an aircraft radar display of terrain, said apparatus comprising a means for scanning a first map to generate a video signal corresponding to radar reflectance information, a means for scanning a second map to generate a first analog signal corresponding to an elevation curve of a scan of terrain; means for differentiating the first analog signal to obtain a second analog signal corresponding to the slope of the terrain curve; means for generating a third analog signal which increases linearly with each scanning time and corresponds to the ground range between the simulated aircraft and the terrain being scanned; computer means coupled to receive the first analog signal and operable to subtractively combine the terrain elevation from a signal representative of the altitude of the simulated aircraft above sea level to obtain a fourth analog signal corresponding with the height of the simulated aircraft above the terrain; computer means coupled to receive the third analog signal and the fourth analog signal and operable to generate a fifth analog signal corresponding with the tangent function of an angle extending upwardly from the terrain to the simulated aircraft; and computing means coupled to receive the second analog signal and the fifth analog signal together with the video signal and operable to effectively multiply the video signal by the cosine of an angle of incidence of the simulated radar line of sight computed from tangent functions of the terrain slope and the simulated radar line of sight said cosine of the angle of incidence being derived in accordance with an equation:

$$\cos \gamma = \left(\frac{1}{1+\sqrt[3]{4}\tan \lambda}\right)^k \cdot \left(\frac{1}{1+\sqrt[3]{4}|\tan \beta|}\right)^k \cdot (\tan \lambda + \tan \beta)$$

where $\cos \gamma$ corresponds to the cosine of the angle of incidence, $\tan \lambda$ corresponds to the fifth analog signal, and $\tan \beta$ corresponds to the second analog signal.

6. Apparatus for simulating an aircraft radar display of terrain, said apparatus comprising a means for scanning a first map to generate a video signal corresponding to radar reflectance information, a means for scanning a second map to generate a first analog signal corresponding to an elevation curve of a scan of terrain; means for differentiating the first analog signal to obtain a second analog signal corresponding to the slope of the terrain curve, tan β; means for generating a third analog signal which increases linearly with each scanning time and corresponds to the ground range between the simulated aircraft and the terrain being scanned; computer means coupled to receive the first analog signal and operable to subtract said first analog signal from a constant signal representative of the altitude of the simulated aircraft to obtain a fourth analog signal corresponding with the height of the simulated aircraft above the terrain; computer means coupled to receive the third and the fourth analog signals and operable to generate a fifth analog signal corresponding with the tangent function of an angle extending upwardly from the terrain to the simulated aircraft, tan λ; computer means coupled to receive the fifth analog signal and operable to generate a sixth analog signal corresponding to a function, $(1+\sqrt[3]{4}\tan \lambda)$; computer means coupled to receive the second analog signal and the fifth analog signal and operable to generate a seventh analog signal corresponding to the function, $(\tan \lambda + \tan \beta)$; computer means coupled to receive the second analog signal and operable to generate an eighth analog signal corresponding to a function, $(1+\sqrt[3]{4}|\tan \beta|)$; and final computing means coupled to receive the sixth, seventh and eighth analog signals together with the video signal, and operable to effectively multiply the video signal by the cosine of an angle of incidence of the simulated radar line of sight computed from tangent functions of the terrain slope and the simulated radar line of sight.

7. Apparatus in accordance with claim 6 wherein the final computing means comprises a summing amplifier for effectively computing the cosine of an angle of incidence of radar line of sight, cosine of γ; said cosine of γ being computed from the formula $$\cos \gamma = \left(\frac{1}{1+\sqrt[3]{4}\tan \lambda}\right)^k \cdot \left(\frac{1}{1+\sqrt[3]{4}|\tan \beta|}\right)^k \cdot (\tan \lambda + \tan \beta)$$

8. Apparatus for simulating an aircraft radar display of terrain, said apparatus comprising a means for scanning a first map to generate a video signal corresponding to radar reflectance information, a means for scanning a second map to generate a first analog signal corresponding to an elevation curve of a scan of terrain; a differentiation amplifier coupled to receive the first analog signal and operable to generate a second analog signal corresponding to the slope of the terrain curve, tan β; a ramp generator for generating a third analog signal which increases linearly with each scanning time and corresponds to the horizontal distance between the simulated aircraft and the terrain being scanned; a first non-linear amplifier coupled to receive the first analog signal and operable to subtract the first analog signal from a constant signal representative of the altitude of the simulated aircraft to generate a fourth analog signal corresponding with the logarithm of the height of the simulated aircraft above the terrain; a summing amplifier coupled to receive the third and fourth analog signals and operable to generate a fifth analog signal corresponding with the logarithm of the tangent of an angle extending upwardly along the radar line of sight to the simulated aircraft, log tan λ; another non-linear amplifier coupled to receive the fifth analog signal and operable to generate a sixth analog signal corresponding with the tangent function of the angle extending upwardly along the line of sight, tan λ; another non-linear amplifier coupled to receive the sixth analog signal and operable to generate a seventh analog signal corresponding to a function $(1+\sqrt[3]{4}\tan \lambda)$; a summing amplifier coupled to receive the second and sixth analog signals and operable to generate an eighth analog signal corresponding to the function $(\tan \lambda + \tan \beta)$; a means coupled to the second analog signal operable to develop a ninth analog signal corresponding with the absolute value of the tangent to the curve, $|\tan \beta|$; and another non-linear amplifier coupled to receive the ninth analog signal and operable to generate a tenth analog signal corresponding to a function $(1+\frac{3}{4}|\tan \beta|)$; and a final summing amplifier operable to receive the seventh, eighth and tenth analog signals and operable to effectively multiply the video signal by the cosine of an angle of incidence of the simulated radar line of sight computed from the equation:

$$\cos \gamma = \left(\frac{1}{1+\frac{3}{4}\tan \lambda}\right)^k \cdot \left(\frac{1}{1+\frac{3}{4}|\tan \beta|}\right)^k \cdot (\tan \lambda + \tan \beta)$$

References Cited in the file of this patent
UNITED STATES PATENTS

| | | |
|---|---|---|
| 2,737,730 | Spencer | Mar. 13, 1956 |
| 2,788,588 | Lindley | Apr. 16, 1957 |
| 2,994,966 | Senitsky | Aug. 8, 1961 |
| 3,028,684 | Khanna | Apr. 10, 1962 |